Patented Sept. 5, 1944

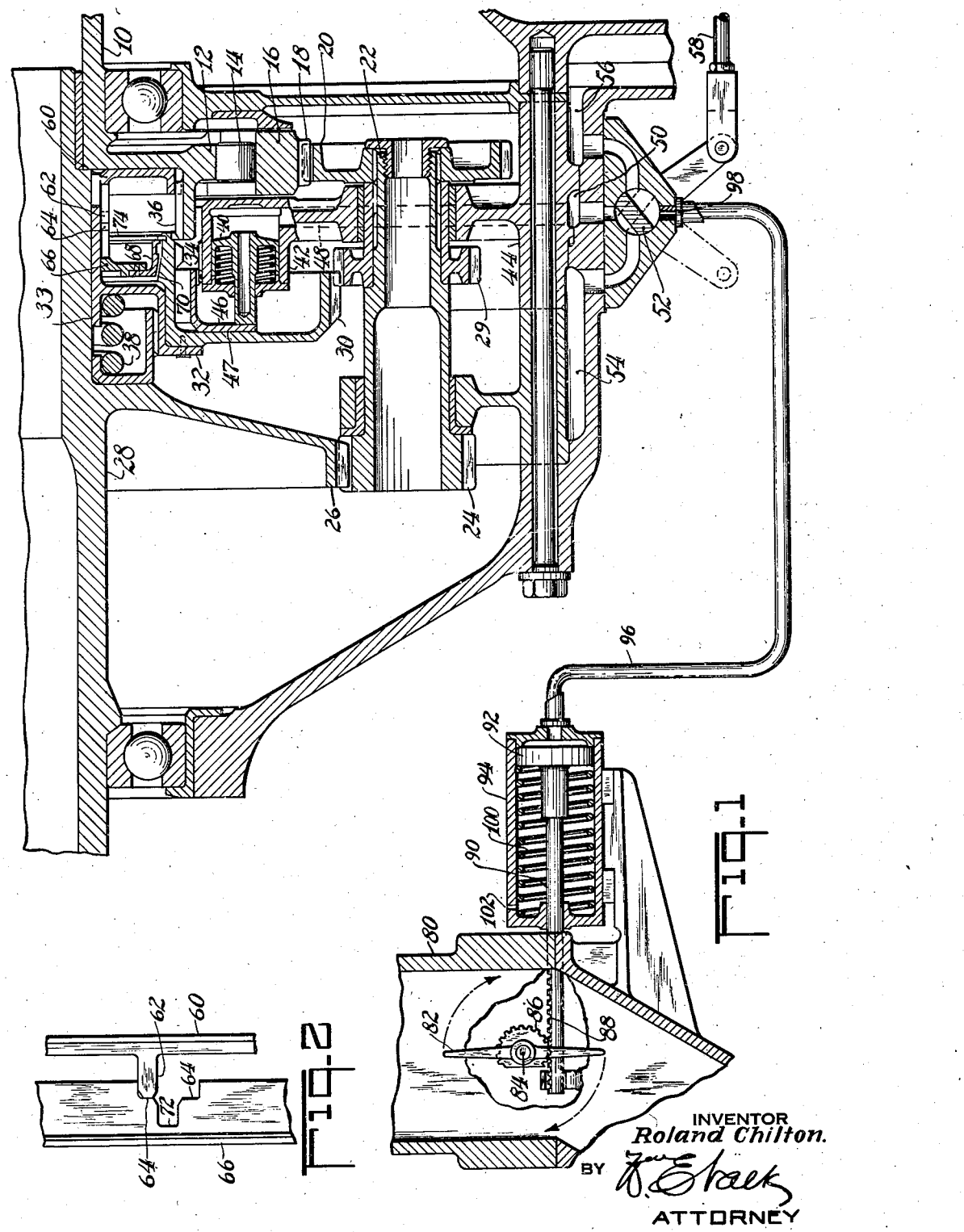

2,357,502

UNITED STATES PATENT OFFICE 2,357,502

CHANGE-SPEED GEAR

Roland Chilton, Ridgewood, N. J., assignor to Wright Aeronautical Corporation, a corporation of New York Application March 20, 1941, Serial No. 384,329

2 Claims. (Cl. 192—01)

This invention relates to gear shift means for obtaining two or more different ratios between a driving and a driven shaft. The invention is intended to be of general application although the embodiment shown is taken from designs for a two-speed propeller drive for an aeronautical engine, with certain simplifications to eliminate structure not pertinent to the present invention per se.

A prime object of the invention is to eliminate the need for friction clutches which, for the powers used in aircraft engines, add excessively to the bulk and weight of the gear and are subject to the following disadvantages: The friction coefficients developed in practice vary over a wide range while the capacity of the clutch must be in excess of the maximum torque to be transmitted at the minimum coefficient which may be experienced in service. In the slipping period, during each clutch engagement, the torque imposed on the gear system is that required to slip the clutch as it relatively accelerates the driving and driven engine and propeller masses to the new speed relation. Accordingly, the gears must be designed to withstand the maximum torque ever developed by the clutch whereas the minimum clutch torque must itself be in excess of the maximum power torque to be transmitted.

A further object is to utilize a shiftable dog clutch between driving and driven members and to provide means whereby engagement is permitted only when the clutch members are rotating at substantially the same speed. A meshing device of the character herein disclosed may be called an inhibiting or a balking device which serves in effect, to prevent clutch engagement under all speed and torque relationships between driving and driven members except when said relationships meet preselected conditions. Still another object is to provide control devices for an engine which are coordinated with the speed changing clutch. More specifically, a feature of the invention resides in novel means for connecting a shifting mechanism with means to decelerate and accelerate an engine during shifting so as to insure that the jaw clutch elements are brought to the unitary speed relationship to which the clutch inhibiting device is responsive to allow of clutch shift. An associated object is to perform these functions automatically in response to the movement of a single control element by the operator.

Other objects of the invention will become apparent in reading the annexed description in connection with the drawing, in which:

Fig. 1 is a fragmentary longitudinal section through a transmission mechanism; and Fig. 2 is a developed plan of a portion of the mechanism.

Although Fig. 1 depicts a two-speed gearset in which one ratio is secured through a roller clutch and another ratio through a jaw clutch, both drive ratios, and in fact additional drive ratios, may be secured by the use of additional gearing and/or additional jaw clutches, the jaw clutches each having the inhibiting mechanism of the invention. As shown, 10 represents a driving shaft which may be rigid with the crankshaft of an engine, this shaft being integral with an inner cam member 12 of a conventional one-way clutch comprising rollers 14 embraced by a driven ring 16, the latter having external gear teeth 18 meshed with a pinion 20 of a layshaft 22 which in turn is provided with a drive pinion 24 meshed with a driven gear 26 on a driven shaft 28. The layshaft may be one of several similar circumferentially disposed layshafts each having pinions 22 and 24 and each having in addition, a pinion 29 meshed with a gear 30 secured to a hub 32 piloted at 33 on the driven shaft 28. The gear 30 is axially movable but remains meshed with the pinion 29 at all times, said gear 30 including clutch teeth 34 movable into and out of engagement with clutch teeth 36 rigid with the member 10. A spring 38, reacting on the hub of the gear 26, presses the hub 32 to the right to enforce engagement of the clutch teeth 34 and 36, and this rightward pressure is offset by pistons 40 engaging cylinders 42 rigid with a housing member 44, the pistons 40 acting on a thrust annulus 46 bearing at 47 on the gear 30. Ratio changes in the gearset are effected by admitting fluid to or withdrawing fluid from the cylinders 42 through passages 48 leading to an annulus 50 which annulus is selectively connectable through a valve 52 to a fluid pressure source 54 or to a fluid dump passage 56. The valve 52 is operated by a manual control rod 58 by which ratio changes are preselected.

From the above it will be apparent that the low ratio drive as shown, is accomplished from the shaft 10 through the roller clutch 12, 14, 16, through the gear engagement 18, 20, the layshaft 22, the gear engagement 24, 26 to the driven shaft 28. During the low ratio drive the gear 30, though meshed with the pinion 29, idles on the driven shaft 28.

When the high ratio drive is selected, pressure fluid in the cylinders 42 is released, causing the spring 38 to urge engagement of the clutch teeth 34, 36. When the clutch 34, 36 is engaged, the gear 30 is directly driven by the shaft 10 and in turn, the high speed drive ratio is afforded through the gear engagements 30, 29, the layshaft 22, and the gear engagements 24, 26 to the driven shaft 28.

Ordinarily the toothed clutch 34 and 36 in a system of this kind would be replaced with a friction plate clutch since it is obvious that the clutch teeth 34 and 36 cannot be engaged unless they are rotating at nearly identical speeds. Part of the essence of this invention consists in providing means to permit engagement of clutch teeth such as 34 and 36 only when they are synchronized so that they may be engaged or disengaged without catastrophic effect either upon themselves or upon the rest of the mechanism. To this end, I provide an annulus 60 secured to the shaft 10 which carries one or more axially extending fingers 62 each engaging a notch 64 in a ring 66 rigid with a cone clutch element 68 which at times is engaged by a complementary cone clutch element 70 formed in the hub of the gear 30. Centrally of the notch 64 is a deeper notch 72 into which the finger 62 may at times pass, as will be described. The element 66 with its cone clutch element 68 is constrained to axial movement with and with respect to the gear 30 by means of a lock ring 74 and obviously, the ring 66 may rotate with and to a limited degree with respect to the ring 60 due to the engagement of the finger 62 in the relatively wide notch 64.

Now, assuming that the transmission is in low ratio with the clutch teeth 34 and 36 disengaged, relief of oil pressure from the cylinders 42 will allow the spring 38 to press the gear 30 and its hub 32 toward the right. This will enforce engagement of the cone clutch 68, 70 and will press the ring 66 firmly against the finger 62 of the ring 60, there being slippage in the clutch 68, 70 while the driving member 10 and the gear 30 are not at synchronous speed. Now, if the driving member 10 be decelerated to the point where it passes synchronism with the member 30, which will continue to rotate due to inertia of the driven load, the ring 66 will, due to clutch torque, move angularly with respect to the ring 60 a sufficient amount for the finger 62 to drop into the notch 72 thus permitting axial movement to the right of the gear hub 32 with coincidental engagement of the clutch teeth 34, 36 whereupon the other ratio of drive is established. Upon acceleration of the driving member 10, the driving torque is transmitted through the teeth 34, 36 to afford the high ratio drive, and in this drive the gear 18 will overrun on the clutch rollers 14 with respect to the driving member 10.

To return to the low ratio drive, pressure fluid is admitted to the cylinders 42 and the pistons will urge the gear 30 to the left to urge disengagement of the clutch teeth 34, 36 but the force exerted by the pistons 40 will be of a sufficiently low order that, although greater than the force exerted by the spring 38, it will be insufficient to disengage the clutch teeth 34, 36 unless drive torque be diminished by decelerating the drive shaft 10 or accelerating the driven shaft 28. If the clutch were forcibly disengaged under full torque conditions, the corners of the clutch teeth 34, 36 would be torn off.

When this system is applied to the propeller drive gear of an internal combustion engine, the deceleration and acceleration of the drive shaft 10 may be coordinated with the gear shift selection by means shown in the lefthand side of Fig. 1. Thereat, 80 represents the main induction pipe to the engine in which is disposed a throttle valve 82 mounted on a shaft 84 which carries a gear 86 meshed with a rack 88 which forms a leftward continuation of a piston rod 90 carrying a piston 92 slidable in a cylinder 94 connected at its righthand end to a pipe 96 having a restricted orifice 98 at the valve 52. The piston 92 is urged to the right in its cylinder 94 by a spring 100, and the lefthand end of the cylinder is vented as at 102 to allow of free action of the piston.

The piston stroke will be so chosen as to swing the throttle valve 82 through 180° from full open position through closed position to full open position. Now, when the valve control rod 58 is in the position shown in full lines, the transmission is set for low ratio drive through the roller clutch 14. When a shift is made to high ratio, the valve rod 58 is moved to the left as shown in dotted lines, which will relieve fluid pressure from the transmission control cylinders 42 to prepare the clutch 34, 36 for engagement and coincidentally, fluid pressure from the pressure supply 54 is directed to the cylinder 94 by which the throttle valve 82 is caused to move from full open, through closed and to full open position, thereby temporarily decelerating the engine through the synchronization point to permit of the engagement of the high speed drive clutch 34, 36. Return of the throttle valve to the full open position affords prompt restoration of full power operation. The orifice 98 in the throttle control line serves to establish a definite interval of operation of the throttle valve 82 to make sure that the drive shaft 10 decelerates a sufficient amount so that its speed is reduced at least to that of the speed of the gear 30 so that engagement of the clutch teeth 34, 36 is assured. Although return to the low speed ratio is also accompanied by temporary closure of the engine throttle, the time interval for this transition is not material so long as a reversal of torque takes place between the drive member 10 and the driven member 28 to permit no-load clutch disengagement.

Although a throttle control device for the engine is shown as means to decelerate same, it is obviously feasible to utilize any other control means by which speed change is afforded between the driving and driven members.

In all gear-shift systems it is necessary to bring the transmission to zero torque to effect a shift. In conventional automobile transmissions, this is done by disengaging a friction clutch between the engine and the transmission whereas in the present case, it is achieved by momentarily suppressing the engine torque by automatically closing a throttle which is immediately opened again.

Applicant is aware that, in conventional automobile transmissions, friction "synchro-mesh" devices are used to coerce the members to be engaged to unitary speed. When the main friction clutch which disconnects the transmission from the engine has little drag and small flywheel effect, the required friction capacity in this coercive type of synchronizer is relatively small. However, in the current invention, where such main friction clutch is eliminated and where the systems to be synchronized comprise large flywheel masses as in airplane engines and propellers, a synchronizing device to effect relative deceleration of such large masses would require extremely great frictional capacity. It is therefore important to note that, in the device of this invention, the friction clutch 68 of the inhibitor merely has to move the light inhibitor member 68 through a few degrees. In other words, in this invention, the power required for acceleration or deceleration to bring the engaging members to unitary speed is provided by the power of the engine itself, under automatic throttle manipulation as described. The inhibitor is a novel device to insure that the automatic meshing action shall occur only at that instant during this acceleration and deceleration at which the parts reach unitary speed, i. e., the instant of transition at which the relative speed changes from positive to negative (or vice versa) and at which, accordingly, the friction torque from the inhibitor clutch 68 reverses and the inhibitor finger 62 is moved from whichever shoulder 64 it may previously have engaged so as to fall into the slot 72.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. In combination, an internal combustion engine, a change speed gearset therefor including a pair of engageable toothed members, means to effect engagement of said toothed members upon synchronism of their rotational speeds, an auxiliary normally-open engine throttle valve, and means connected to said throttle valve and operable upon movement in one direction to effect progressive movement of said throttle valve from an open position toward closed position and back to an open position to thereby synchronize said toothed members, said means being operable upon its return movement to likewise effect progressive movement of said throttle valve from an open position toward a closed position and back to an open position to permit disengagement of said toothed members.

2. In combination, an internal combustion engine, a change speed gearset therefor including a pair of engageable toothed members, means to permit engagement of said toothed members only upon synchronism of their rotational speeds, means controllable to urge said members toward or away from each other, an auxiliary normally-open engine throttle valve, means connected to said throttle valve and operable upon movement in one direction to effect progressive movement of said throttle valve from an open position toward a closed position and back to an open position to thereby synchronize said toothed members, said means being operable upon its return movement in the opposite direction to likewise effect progressive movement of said throttle valve from an open position toward a closed position and back to an open position to permit disengagement of said toothed members, and a single control member operable to control both said urging means and said throttle valve operating means.

ROLAND CHILTON.